(No Model.)

W. KRATZER.
ANTI-FRICTION JOURNAL BEARING.

No. 334,670. Patented Jan. 19, 1886.

WITNESSES
John Enders Jr.
Harry S. Rohrer

Wayne Kratzer
INVENTOR
By Duffy & Brosheon
Attorneys

UNITED STATES PATENT OFFICE.

WAYNE KRATZER, OF ALLENTOWN, PENNSYLVANIA.

ANTI-FRICTION JOURNAL-BEARING.

SPECIFICATION forming part of Letters Patent No. 334,670, dated January 19, 1886.

Application filed December 16, 1885. Serial No. 185,872. (No model.)

*To all whom it may concern:*

Be it known that I, WAYNE KRATZER, of Allentown, in the county of Lehigh and State of Pennsylvania, have invented certain new and useful Improvements in Anti-Friction Journal-Bearings; and I do hereby declare that the following is a full, clear, and exact description of the invention, which will enable others skilled in the art to which it appertains to make and use the same, reference being had to the accompanying drawings, and to the letters of reference marked thereon, which form part of this specification.

My invention relates to journal-bearings for general uses; and it has for its object to improve the construction of such devices, that the amount of friction and noise will be reduced to a minimum, while the wearing capacity will be increased to a maximum, thus insuring easy, noiseless operation and great durability, and at the same time having due respect for simplicity and cheapness.

To these ends my invention consists in the improved construction, arrangement, and combination of parts hereinafter described, and afterward specifically pointed out in the claims.

This improvement is shown and described in my application filed October 19, 1885, Serial No. 180,227, but not claimed therein, except in combination with band-saw guide.

Figure 1:
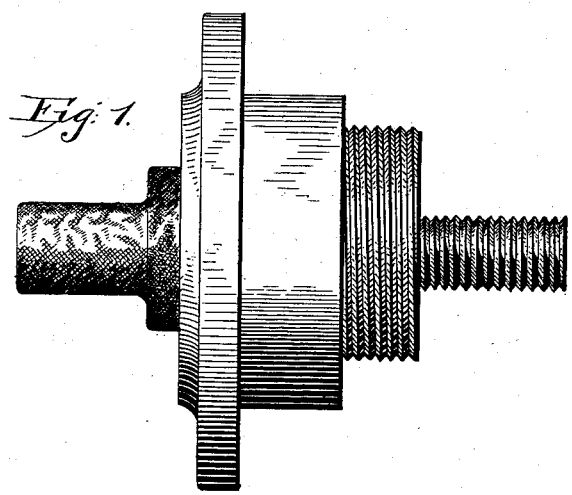
Figure 2:
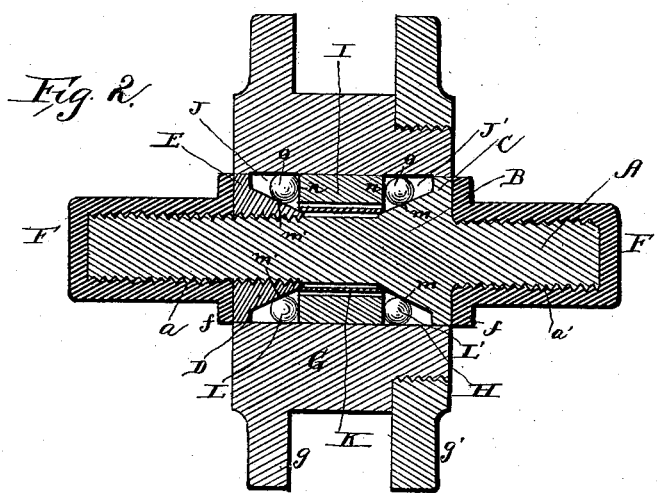

In the accompanying drawings, Figure 1 shows a hub on which a pulley, wheel, or other similar device may be rigidly placed or mounted, the clamping-nut and one of the rubber end caps being removed; and Fig. 2 is a central section of the same, showing all the parts in position.

Referring to the drawings by letters, A is the shaft, having an enlargement consisting of a cone, B, ending in a circumferential flange, C, and screw-threaded at $a\ a'$. A nut constructed with a cone, D, and circumferential flange E, both of which correspond with the enlargement B C on the shaft, engages by its interior thread the thread $a$ on the shaft. A rubber cap, F, having a flange, $f$, is threaded on each end of the shaft. G is a hub having a flange, $g$, and shown here with a nut, $g'$. This hub may be constructed as here shown, or in any other suitable manner to receive a pulley, wheel, or other suitable rotatable device. This hub is centrally bored at H, within which bore is fitted closely, by driving or otherwise to a central position therein, a bushing, I, whose width is somewhat less than the width of the hub. The central bore of the hub is of a diameter to admit the circumferential flanges C E and permit of the easy rotation of the hub upon them. When the shaft is inserted and the conical nut screwed into position in the hub, as shown in Fig. 2, an annular space, J, is left between the conical nut and flange D E and the interior of the hub and one end of the bushing I. A similar annular space is also left at J' between the enlargement of the shaft, the interior of the hub, and the other end of the bushing-ring I. A sleeve, K, within the ring I, and surrounding the central portion of the shaft A, serves as a stop to prevent the nut being turned up too far, and is of a predetermined length for that purpose. Its diameter is sufficiently large to allow the inner end of the conical enlargement to enter one end, while the inner end of the conical nut enters the other, but is not sufficiently large to bring it into contact with the interior of the bushing I. The annular spaces J J' serve as receptacles for annular series of steel balls L L', which, when the parts are properly adjusted, as aforesaid, have three points of bearing— viz., $m$ or $m'$ on the conical enlargement, and conical nut $n$ on the ends of the bushing I, and $o$ on the interior of the hub.

The operation of my improved anti-friction journal-bearing may be described as follows: The shaft being properly mounted by placing it with the rubber caps in suitable bearings, thereby rendering the operation noiseless, the hub, with its inserted bushing I and any suitable wheel, pulley, &c., which may be mounted upon it, will be rotated upon the other portions of the structure, set up as described, and shown in Fig. 2, the sole points of contact between the stationary and rotating portions being the points where they engage the steel balls. The parts which come in contact with the balls, as well as the balls, are highly tempered and polished, thus reducing friction and noise to a minimum, and rendering the device as nearly as possible free from objection due to wearing of the parts. The sleeve K not only serves to regulate the distance of the two cones from each other, but also acts as a lock for the conical nut, thus dispensing with the nut-lock on the outside, which would be an obstruction to the proper operation of the device.

The advantage of making the hub and the bushing I separate is, that the extreme difficulty and well-nigh impossibility of properly turning the parts in one single piece is obviated.

It may be seen at a glance that a practically frictionless and noiseless journal-bearing is the result of my improved construction, no matter whether the shaft be placed horizontally, vertically, or at any intermediate angle, the arrangement being such that substantially the same points of bearing exist in any of these positions.

Having thus described my invention, what I claim is—

1. In an anti-friction journal having in its central bore a bushing which forms recesses in the end of the hub, two conical bearings having less diameter than the bushing, and a lock-sleeve interposed between said conical bearings, in combination with rolls, substantially as set forth.

2. The combination, in an anti-friction journal, of the hub having in its bore centrally located, a bushing, a spindle passing through said bushing which forms a conical bearing, the conical nut on the other end of said spindle, and a sleeve for locking the conical nut to the spindle, and rolls working in the recesses formed between the bushing and the conical bearings, substantially as described.

3. The combination, in an anti-friction journal, of the hub having a central bore, a bushing located therein, conical bearings and rolls adapted to work in the recesses formed in a hub, and a spindle having prolongations to carry noiseless cushioning devices, substantially as set forth.

In testimony that I claim the foregoing as my own I hereto affix my signature in presence of two witnesses.

WAYNE KRATZER.

Witnesses:
O. E. DUFFY,
S. BRASHEARS.